United States Patent [19]

Campbell, Jr. et al.

[11] 4,288,271
[45] Sep. 8, 1981

[54] TEMPERATURE CONTROL APPARATUS

[75] Inventors: Glenn M. Campbell, Jr., Hopkins, Minn.; Raymond K. Newkirk, 110 Loring Dr., Mound, Minn. 55364

[73] Assignee: Raymond K. Newkirk, Mound, Minn.

[21] Appl. No.: 153,082

[22] Filed: May 27, 1980

[51] Int. Cl.³ .............................................. B05G 15/00
[52] U.S. Cl. .................. 156/359; 219/494; 219/497; 219/512
[58] Field of Search .............. 219/512, 491, 494, 482, 219/243; 156/359

[56] References Cited

U.S. PATENT DOCUMENTS

| 2,987,598 | 6/1961 | Chace et al. | 219/19 |
| 3,199,388 | 8/1965 | Redfield | 83/16 |
| 3,283,126 | 11/1966 | Velvel | 219/512 X |
| 3,574,275 | 4/1971 | Staschke | 60/23 |
| 3,947,656 | 3/1976 | Lodi | 219/482 X |
| 4,100,837 | 7/1978 | Kohler | 90/11 R |
| 4,148,236 | 4/1979 | Holoyen et al. | 83/74 |

Primary Examiner—David A. Simmons
Attorney, Agent, or Firm—Orrin M. Haugen; Thomas J. Nikolai

[57] ABSTRACT

A circuit arrangement for controlling the temperature of a thermoplastic bonding or cutting blade in which changes in the length of the blade caused by temperature variations are monitored and a signal is developed and fed back for controlling the amount of current flowing through the blade to thereby maintain its temperature at a desired preset level.

1 Claim, 2 Drawing Figures

TEMPERATURE CONTROL APPARATUS

BACKGROUND OF THE INVENTION

I. Field of the Invention:

This invention relates generally to temperature control apparatus and more specifically to an open loop control circuit for maintaining the temperature of a bonding blade at a desired preset value.

II. Discussion of the Prior Art:

In my earlier patent, U.S. Pat. No. 4,189,340, there is described a thermoplastic bonding machine especially designed to bond or weld together two three-dimensional articles formed of foamed or expanded polystyrene plastic. The two articles to be joined are held in a fixture with the edges of the articles to be bonded aligned. Thereafter, a heated blade is passed through the juncture zone at a predetermined rate so as to contact both of the abutting surfaces of the two articles to be bonded. The heated knife first fuses the surfaces of the articles to be joined and subsequently a programmed motion is applied to the articles to force them together while the fused portions solidify. When working with foamed plastic material such as foamed polystyrene, it is known that accurate control must be maintained over the temperature and rate of travel to the thermal bonding blade as it traverses the juncture zone to ensure acceptable bonding of the two articles together. The present invention addresses the former aspect, i.e., the temperature control of the bonding blade. However, while the preferred embodiment will be explained in connection with a thermoplastic bonding application, it is conceivable that the present invention may find wider application such as in the cutting of thermoplastic materials or the like, that no limitation to the use in bonding apparatus is intended.

In heat sealing or thermal bonding systems it is essential that proper attention be paid to the blade temperature and the speed at which the blade traverses the material being operated upon. If the blade temperature is too high for a given speed, too much of the material becomes fused at the juncture zone and a density discontinuity in the resulting article results. However, if the temperature is too low, insufficient fusion takes place and an imperfect joint or weld results.

In the Gassner U.S. Pat. No. 3,016,085 there is described an apparatus for heat sealing a thermoplastic web in which the heat is controlled as a function of the speed of the web past the heating element. At such, a relatively expensive control circuit involving a tachometer-type dynamo and a magnetic amplifier circuit having means for establishing a set-point is required.

In the case of the present invention, the workpieces to be joined may be moved relative to the heating blade at a constant speed and means are provided for controlling the temperature of the blade by monitoring the change in length of that blade occasioned by changes in its temperature and then utilizing the resulting change in length to vary the amount of current flowing through the blade. Alternatively, the length changes of the thermal bonding blade occasioned by blade temperature changes can be monitored and those length changes may, in turn, be used to control the speed of movement of the workpieces relative to the blade. Hence, precise control over bonding temperatures for fixed or variable travel speeds may be obtained without the need for costly workpiece speed sensing apparatus required in prior art systems.

SUMMARY OF THE INVENTION

The blade temperature control system of the present invention comprises a nickel/chromium blade exhibiting a predetermined electrical resistance which is mounted solidly to a top surface of a blade carriage by means of a copper mounting block which is electrically isolated from the carriage by a suitable insulating spacer. The copper block serves as a connection point for the power supply used to provide the current for resistance heating the blade to its required bonding temperature. The bottom of the blade is also connected to a copper block which serves as the other power connection point. Rather than being fixedly secured to the lower portion of the movable carriage, it is coupled to a pneumatic cylinder which, in turn, is mounted to the carriage assembly. This mounting arrangement allows the blade member to expand and contract as it heats and cools while still being kept under relatively constant tension. This expansion and contraction of the blade as it is heated and cooled forms the basis for the temperature control system.

The temperature control system is based on the linear expansion rate of the blade material as it is heated. For example, a blade made from resistive nickel/chromium band stock which is nominally 0.375 inches wide × 0.040 inches thick × 38.625 inches long may have a coefficient of linear expansion of 0.00065 inches per degree centigrade. The change in length is measured by a linear proximity sensor mounted on the blade carriage. As the blade heats up due to the current flow through it, it expands, which allows the bottom holding block to drop, thereby bringing a conductive target closer to the proximity sensor. The proximity sensor is of the type such that as the target is made to draw closer to it, its voltage output decreases. The sensor output is fed to a SCR current controller which functions to compare the voltage level of the sensor to the voltage level established by a set-point potentiometer. Thus, the current supplied to the blade is a function of the sensor output which, in turn, is directly related to blade length.

The control circuit of the present invention further includes a set-point adjustment control which may be used to set the temperature of the blade at any temperature between, ambient and a predetermined upper limit. The blade length sensor and associated power supply coacts with the SCR current controller to maintain the blade temperature relatively constant even though the heat dissipated therefrom may vary as the blade is made to traverse through varying masses of material to be bonded. Varying the set-point adjustment to a different value causes a corresponding change in blade length and temperature.

OBJECTS

It is accordingly a principal object of the present invention to provide an improved apparatus for controlling the temperature of a resistance heating element.

Another object of the invention is to provide an improved apparatus for controlling the temperature of a resistance heated bonding or sealing element in a thermoplastic bonding or sealing machine.

A further object of the invention is to provide a temperature controller for a resistance heating element in which the length of the element is monitored and used to control the level of current flowing through the element.

Yet another object of the invention is to provide, in a thermoplastic bonding machine, an apparatus for maintaining precise control over the temperature of the bonding/sealing blade by sensing changes in the elongation of the blade and adjusting current flow through the blade and/or the speed of travel of the workpiece past the blade as a function of that change.

These and other objects and advantages of the invention will become apparent to those skilled in the art from the following detailed description of the preferred embodiment, when considered in conjunction with the accompanying drawings.

DESCRIPTION OF THE PREFERRED EMBODIMENT

Figure 1:
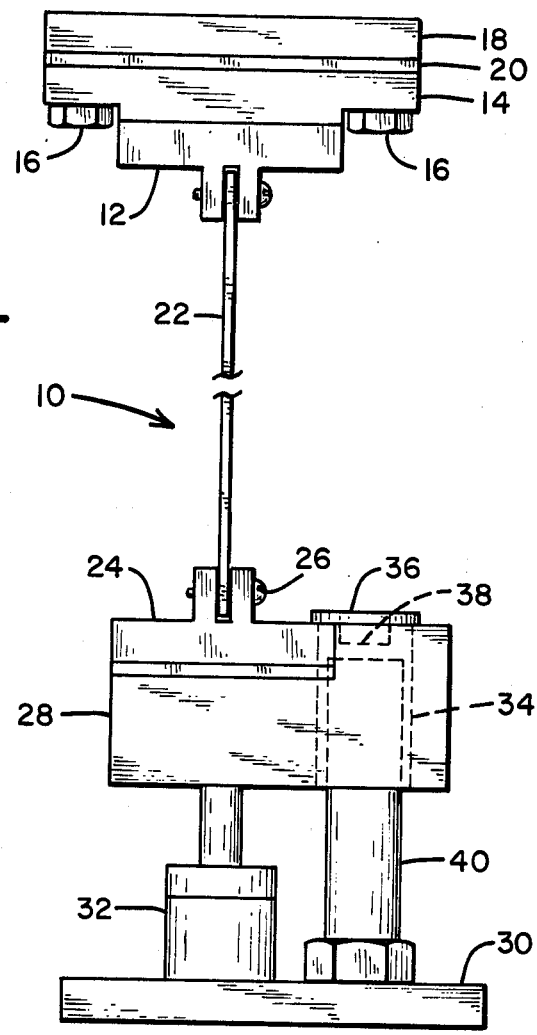
FIG. 1 is a schematic mechanical view showing the arrangement of a resistance heated blade relative to a length sensor.

As is set forth in my aforereferenced U.S. Pat. No. 4,189,340, there is described in quite specific terms the construction of a machine in which the system of the present invention may find use. Hence, for purposes of description, the subject matter of that patent is hereby incorporated by reference. As is set forth in that patent, a carriage mechanism is provided for causing a heated blade to move at a controllable rate through a plane defined by the juncture zone of two three-dimensional plastic objects to be joined. With reference to FIG. 1, then, the mechanical blade assembly is indicated generally by numeral 10 and comprises a first conductive holding block 12 which is affixed to a insulating mounting block 14 which, in turn, may be connected as by bolts 16 to an upper movable carriage arm 18. A spacer or shim 20 may also be used to establish a desired spacing between the various mating parts, all as will be further explained hereinbelow. Affixed at one end to the conductive block 12 is a blade member 22 which may, for example, be formed from a suitable resistance heating material, such as a nickel/chromium alloy. With no limitation intended, the blade may, for example, be approximately 40 inches long and be 0.375 inches in width and have a thickness dimension of 0.04 inches. It is to be understood that these dimensions are not critical but have been found useful in the design of an actual machine used for bonding three-dimensional objects of a predetermined size. Such a blade, when formed of the indicated material, exhibits a coefficient of linear expansion, $\alpha$, equal to 0.00065 inches per degree centigrade change in temperature. The bottom end of the blade 22 is also fastened to a conductive holding block 24 as by a bolt 26, the holding block being fitted within the recess of an insulating block 28. Rather than fastening the block 28 directly to the lower movable carriage arm 30, a tension cylinder 32 is disposed therebetween to maintain a predetermined tension force on the blade member 22.

Formed through the insulating block 28 is a bore 34 and affixed to the upper edge surface of the insulating block 28 is a conductive target member 36 having an integrally formed stem portion 38 thereof extending into the bore 34. Also mounted on the carriage member 30 is a proximity sensor 40, a portion of which extends upward into the bore 34 formed in the insulating block 28.

As will be explained more fully hereinbelow, the sensor 40 produces a voltage output which may be calibrated to bear a predetermined relationship to the spacing between the target member 36 and the upper end of the sensor element 40. With the target member 36 floating relative to the upper end of the sensor 40 and being mechanically connected to the lower end of the blade 22, the spacing between the target and the sensor is governed strictly by the length of the blade 22, the blade being maintained under a tension force by the tension cylinder 32.

Now that the mechanical features of the invention have been set forth, consideration will be given to the electrical circuit used to control the flow of heating current through the blade 22.

Identified by numeral 42 is a source of alternating current voltage which may, for example, be 230 volt 60 Hz which is adapted to supply electrical current through a silicon controlled rectifier (SCR) type current controller 44 to the primary windings of a current transformer indicated generally by numeral 46. A potentiometer 49 is coupled to the SCR controller 44 and permits an operator to establish the set-point for the system. The controller 44 may, for example, be a type C-400818 SCR controller manufactured and sold by the Enirex Company of Paterson, N.J. This device allows the output therefrom to be varied between the full applied input voltage and zero as a function of the control voltage applied to its control input terminals A and B.

The secondary winding 48 of the transformer has a first terminal thereof connected by a conductor 50 to the upper conductive block 12 (FIG. 1) and its remaining terminal connected by a conductor 52 to the lower conductive block 24 of the blade holding assembly. With a voltage appearing across the secondary winding 48, then, a current may be made to flow through the conductive blade 22, causing it to be heated. The blade, having a positive coefficient of linear expansion, increases in length as the temperature increases to thereby cause the target element 36 to move closer to the proximity sensor 40, which, acting through the sensor power supply 54, causes a change in the control voltage applied to the control terminals A, B of the SCR controller 44.

In practicing the present invention, a proximity sensor 40 and power supply 54 therefore may be a type PA11503 which is manufactured and sold as a unit by the Electro Corporation of Sarasota, Fla. With this device, the voltage output from the power supply 54 can be made to vary between 0 and 10 volts DC depending upon the proximity of the target 36 to the sensor 40.

Figure 2:
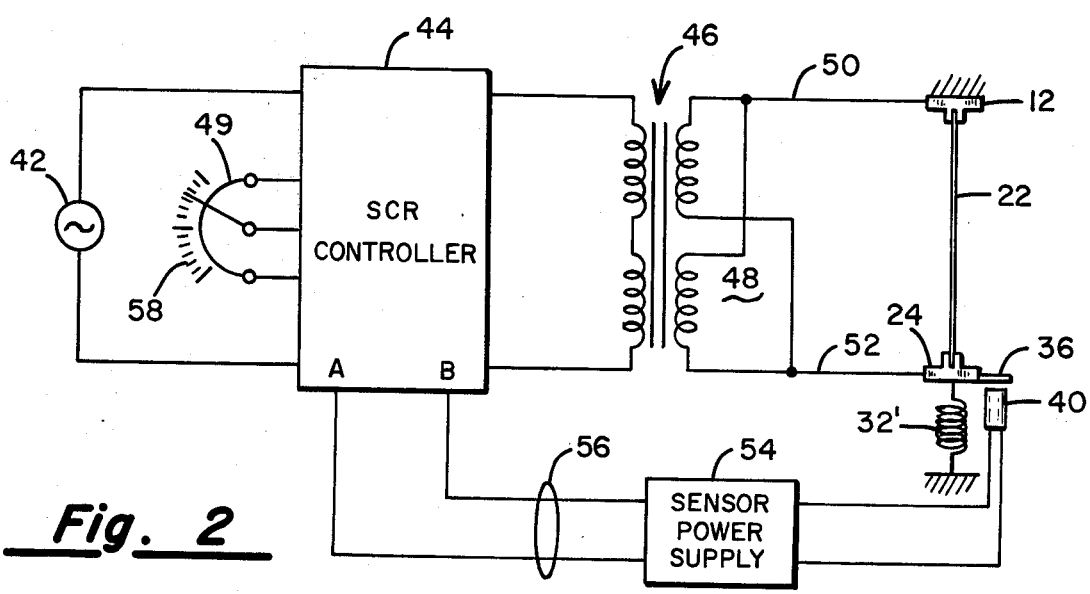
FIG. 2 is a schematic electrical diagram of the circuit used to control the current flow through a resistance heated blade of FIG. 1.

It can be seen, then, that the expansion and contraction of the blade 22, as it is heated and cooled by changes in the current flowing through the blade 22 and by the rate of dissipation of the heat energy into a surrounding media, forms the basis for the temperature control system. In that the blade has a linear coefficient of expansion, as it heats up it expands and allows the tension cylinder 32 (FIG. 1) which is represented by a spring 32' in FIG. 2 to move the steel target 36 closer to the proximity sensor 40. As the target gets closer, the voltage output from the sensor 40 decreases. This output voltage is fed from the sensor power supply 54 over the lines 56 to the SCR power controller 44. The controller 44 compares the voltage level of the sensor output to the voltage level established by the temperature set-point potentiometer 49. The SCR current controller 44 operating through the transformer 46 functions to adjust the output voltage applied across the blade and therefore the heating current flowing through it. In this fashion, blade temperature changes occasioned by varying rates of heat dissipation as the blade traverses through the juncture zone of the thermoplastic material to be bonded, instantaneously are reflected in blade length variations which, in turn, are sensed and used to control the amount of heating current applied so that the blade temperature tends to remain substantially constant at the value determined by the set-point potentiometer 49 on the controller 44.

Alternatively, changes in blade length occasioned by temperature changes resulting from variations in the rate of travel of the blade through the juncture zone may be used to develop a control signal for the motive means employed to move the blade relative to the workpiece so that its rate can be controlled.

With the type of controller employed, it is possible to set the temperature of the blade anywhere between, say, 833° C. and ambient temperature. It is not necessary that the dial 58 reflect a direct temperature setting but, if desired, the dial can be calibrated to do so. Instead, it may be more convenient to consider the dial as a determination of the blade length, which can be correlated to the temperature that the blade is at. For instance, at a setting of 5 on the dial 58, the SCR controller 44 causes a 5 volt potential difference on the control lines 56 from the output of the sensor power supply 54. The sensor output voltage may initially be at 10 volts when the blade is at ambient temperature. This voltage decreases as the blade expands and the steel target 36 approaches the sensor 40. With a sensor of the type described hereinabove, it exhibits a range of 0.5 inches. The voltage output changes 1 volt for every 0.05 inches which the target 36 moves. Hence, to effect a change of 5 volts, the blade must expand 0.25 inches. With a nickel/chromium blade of a given alloy composition, the rate of thermal expansion for the material may be, for example, 0.00065 inches per degree centigrade change in temperature. Hence, with the exemplary values set forth above, a setting of 5 on the scale 58 results in a blade temperature of 380° C. when equilibrium is reached.

Thus it can be seen that there is provided by this invention a means whereby precise control may be maintained over the temperature of a thermal bonding blade. The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices and that the various modifications, both as to equipment details and operating procedures can be affected without departing from the scope of the invention itself.

What is claimed is:

1. In a machine for bonding two three-dimensional thermoplastic bodies together along a juncture zone, a thermal bonding blade assembly which is adapted to traverse said juncture zone comprising in combination:
   (a) a first conductive holding block insulating lead mounted on an upper movable carriage arm;
   (b) a second conductive holding block;
   (c) tensioning means insulatively coupled between said second conductive block and a lower carriage arm;
   (d) an elongated thermal bonding blade having a predetermined coefficient of linear expansion conductively coupled between said first and second holding block;
   (e) means for applying an electrical voltage between said first and second conductive block;
   (f) a controllable regulator for controlling said electrical voltage;
   (g) means coupled between said second conductive holding block and said lower movable carriage arm for sensing the relative displacement between said second conductive holding block and said lower movable carriage arm and producing an electrical control signal proportional thereto; and
   (h) means coupling said control signal to said controllable regulator whereby the heating current flowing through said thermal bonding blade is regulated as a function of the thermal expansion of said blade.

* * * * *

UNITED STATES PATENT AND TRADEMARK OFFICE
CERTIFICATE OF CORRECTION

PATENT NO. : 4,288,271

DATED : September 8, 1981

INVENTOR(S) : Glenn M. Campbell, Jr. and Raymond K. Newkirk

It is certified that error appears in the above-identified patent and that said Letters Patent are hereby corrected as shown below:

Column 6, line 26, after "lower" insert -- movable --.

Signed and Sealed this

Tenth Day of November 1981

[SEAL]

Attest:

GERALD J. MOSSINGHOFF

Attesting Officer

Commissioner of Patents and Trademarks